(12) United States Patent
Marsh et al.

(10) Patent No.: US 7,529,742 B1
(45) Date of Patent: May 5, 2009

(54) COMPUTER IMPLEMENTED SYSTEM FOR MANAGING AND PROCESSING SUPPLY

(75) Inventors: Thomas Elmo Marsh, Houston, TX (US); Loran Roy Sheffer, Houston, TX (US); David G. Southerland, Houston, TX (US); Steven Carter, Katy, TX (US); Stuart Cochrane, Aberdeenshire (GB); Jeremy Lindsay, Edinburgh (GB); Robert R. Steven, Norfolk (GB)

(73) Assignee: ODS-Petrodata, Inc., Houston, TX (US)

( * ) Notice: Subject to any disclaimer, the term of this patent is extended or adjusted under 35 U.S.C. 154(b) by 48 days.

(21) Appl. No.: 11/734,362

(22) Filed: Apr. 12, 2007

Related U.S. Application Data (63) Continuation-in-part of application No. 10/208,548, filed on Jul. 30, 2002.

(60) Provisional application No. 60/308,745, filed on Jul. 30, 2001, provisional application No. 60/317,214, filed on Sep. 5, 2001.

(51) Int. Cl.
*G06F 17/30* (2006.01)
(52) U.S. Cl. ............ 707/3; 707/5; 707/6; 707/10; 707/104.1
(58) Field of Classification Search ............ 707/3, 707/10, 104.1, 5, 6, 103 R; 166/250.15; 175/38, 48; 705/10; 715/256, 273
See application file for complete search history.

(56) References Cited

U.S. PATENT DOCUMENTS

| | | | | |
|---|---|---|---|---|
| 5,079,753 A * | 1/1992 | Suggs | ............ | 367/107 |
| 5,292,207 A * | 3/1994 | Scott | ............ | 405/207 |
| 5,551,802 A * | 9/1996 | Wybro | ............ | 405/223.1 |
| 5,669,735 A * | 9/1997 | Blandford | ............ | 405/227 |
| 6,445,777 B1 | 9/2002 | Clark | | |
| 6,560,565 B2 * | 5/2003 | Roy et al. | ............ | 702/188 |
| 6,668,253 B1 * | 12/2003 | Thompson et al. | ............ | 707/10 |
| 6,672,390 B2 * | 1/2004 | Azancot | ............ | 166/341 |
| 6,711,565 B1 * | 3/2004 | Subramaniam et al. | ........ | 707/3 |
| 6,801,910 B1 * | 10/2004 | Bedell et al. | ............ | 707/6 |
| 6,820,702 B2 * | 11/2004 | Niedermayr et al. | ............ | 175/57 |
| 6,892,812 B2 * | 5/2005 | Niedermayr et al. | ... | 166/250.15 |
| 7,155,419 B2 * | 12/2006 | Blackman et al. | ............ | 705/80 |

(Continued)

OTHER PUBLICATIONS

Review of the Russian Drilling equipment market, 2008-2009.*

(Continued)

*Primary Examiner*—Jean M Corrielus
(74) *Attorney, Agent, or Firm*—Buskop Law Group, PC; Wendy Buskop (57) ABSTRACT

A computer implemented system for managing and processing mobile drilling unit supply and demand information for a user. The system comprises a web application processor, an interface for communication and a database processor for communication. The interface in communication with the web application processor has a supply query for obtaining a set of supply data and an open demand drilling requirement query for obtaining a set of open demand drilling data. The database processor can be in communication with the interface for receiving at least one of the queries wherein the at least one query operates on a dynamic information relational database in communication with the database processor. The database provides a set of data responsive to the queries. The web application processor further comprises computer instructions for translating the set of data into a viewable online report.

17 Claims, 2 Drawing Sheets

U.S. PATENT DOCUMENTS

| | | | |
|---|---|---|---|
| 7,216,086 B1* | 5/2007 | Grosvenor et al. | 705/7 |
| 7,258,175 B2* | 8/2007 | Veeningen et al. | 175/40 |
| 7,269,668 B2* | 9/2007 | Redford et al. | 710/8 |
| 7,278,496 B2* | 10/2007 | Leuchtenberg | 175/48 |
| 7,293,029 B2* | 11/2007 | Cope | 707/100 |
| 7,296,640 B2* | 11/2007 | Tettleton | 175/66 |
| 7,308,953 B2* | 12/2007 | Barnes | 175/203 |
| 7,333,977 B2* | 2/2008 | Swaminathan et al. | 707/3 |
| 7,367,411 B2* | 5/2008 | Leuchtenberg | 175/48 |
| 2002/0049642 A1 | 4/2002 | Moderegger et al. | |
| 2002/0065759 A1 | 5/2002 | Boies et al. | |
| 2002/0152053 A1* | 10/2002 | Roy et al. | 702/185 |
| 2003/0074391 A1* | 4/2003 | Carter et al. | 709/200 |
| 2004/0178002 A1* | 9/2004 | Kay | 175/57 |
| 2004/0215659 A1* | 10/2004 | Singfield et al. | 707/104.1 |
| 2005/0149410 A1* | 7/2005 | Livesay | 705/26 |
| 2008/0004882 A1* | 1/2008 | Papadimitriou et al. | 704/275 |
| 2008/0201388 A1* | 8/2008 | Wood et al. | 707/203 |
| 2008/0294604 A1* | 11/2008 | Goswami | 707/3 |

OTHER PUBLICATIONS

MnMUDB309A install sets, Jan. 31, 2008.*
www.rigzone.com.
www.riglogix.com.

* cited by examiner

COMPUTER IMPLEMENTED SYSTEM FOR MANAGING AND PROCESSING SUPPLY

CROSS REFERENCE TO RELATED APPLICATIONS

This patent application is a Continuation in Part application that claims the benefit of the prior U.S. Non-Provisional application Ser. No. 10/208,548 filed on Jul. 30, 2002. The prior co-pending non-provisional application is herein incorporated by reference.

FIELD

The present embodiments relate generally to a knowledge based system providing for the collecting, presenting, exchanging and analyzing of information relevant to participation in an equipment market which creates market transparency of supply, demand and prevailing equipment lease rate and enables market participants to match supply with demand requirements.

BACKGROUND

There currently exists a need for a computer implemented system for managing and processing mobile drilling unit supply and demand information to a user. Current applications are unable to obtain query information from the user translating the results of the queries into a viewable online report.

There exists a need for a computer implemented system for managing and processing mobile drilling unit and demand information to a user.

There exists a need for a computer implemented system for obtaining query information from a user and translating the results of the queries into a viewable online report.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The system creates a transparency that aids both the oil company (operator/lessee) and the drilling contractor (lessor) to conduct business in a much more efficient manner. The system provides for the collecting, presenting, exchanging and analyzing of information relevant to the supply and demand for offshore drilling equipment worldwide and their respective prevailing lease rates (day rates). The system allows for an instantaneous worldwide matching of technical drilling requirements to equipment availability, which by traditional methods would take days or weeks.

In general, the present invention involves a system for exchanging information among equipment owners, contractors, and operators/non-operators in oil and gas exploration and production using the Internet. The system includes a host computer programmed to provide selected access to a database of information and to collect, store and manage information in the database. The host computer can also be programmed to enable users to search selected information and to use that information to formulate requests for equipment and contracts to other users of the system and to respond to requests from other users while collecting and storing within the database selected request and response information. The system provides a user interface to enable users to search the database and to formulate requests and responses based on information in the published information portion, community information portion, and the user company's private information portion. On the supply side, the private information typically relates to the user's inventory of equipment and on the demand side to the user's equipment needs. The system provides the user with the ability to organize and store and use virtually all categories of information relevant to participation in the equipment market.

The invention includes a computer-implemented system for managing and processing supply and demand information for participants in an equipment market. The system includes a data processor programmed to receive and store electronically received data in a relational database in an electronic storage medium, a business logic engine comprising computer readable program code stored on a host computer wherein the business logic program code includes a search engine for selectively retrieving data from the database, and an interface engine for communication between a system user and the data processor and the business logic engine whereby the business logic engine operates on data processed by the data processor and the interface engine displays the results of operation by the business logic engine. The system also includes a communications engine for receiving a market inquiry from a demand side market participant and forwarding said inquiry to a supply side market participant and for receiving a response to said inquiry from a supply side market participant and forwarding the received response to the demand side market participant.

In an embodiment of the invention, the search engine and the communications engine of the system each include computer readable program code and the business logic engine includes computer readable program code modules.

In an embodiment, those computer readable program code modules can include a personalization tool module, a search engine module, a report engine module, a forecast tool module, an equipment planning tool module, an equipment usage sequences tool module, a collaboration tool module, an equipment deployment optimization tool module and a day rate calculation tool module.

An embodiment of the interface engine includes means for generating graphical output, means for generating a graphical user interface and means for generating tabular output.

An embodiment of the invention includes a computer implemented system for managing and processing supply and demand information for participants in an offshore drilling rigs market, and the database includes one or more equipment related performance records, each record including one or more unique equipment identifiers and data associated with the identifiers. In the embodiment of the invention, the associated data includes equipment performance data.

The equipment performance data can include well location, water depth, drilled depth, and numbers of actual days on location.

The system of the invention is particularly suited for an embodiment where the data processor, communications engine, and business logic engine are stored on a host computer coupled to the Internet.

It is a feature of the system that graphical output of the system includes Gantt charts where the Gantt charts are generated utilizing a means for creating a session object from each of the search criteria and the search results to generate result objects and a server-side script that can generate a hypertext markup language page having embedded therein image tags wherein each image tag has embedded therein an "src" component. An image-rendering engine enables the system to use the "src" component of the embedded image tags created by the server-side script to pull the search criteria from the session object. This feature of the invention also includes means for calculating the width and height of the image to be produced by the rendering engine, means for generating an image map from the calculated width and height of the image in combination with the search results, means for generating a buffered object for receiving a drawn image, means for drawing rows on the buffered object, means for drawing each of the result objects on the buffered object wherein each result object becomes a chart element that relates to a discrete event in time, means for compressing the buffered object having the result subjects drawn thereon, means for encoding the buffered object as a streamed encoded image, and means for sending the encoded image to an Internet browser for display by the browser to the user.

It is a feature of the invention particularly suited for equipment that includes offshore rigs that the forecast tool module includes means for building a query to invoke operation of the search engine to retrieve data selected from the data group comprising rig data, contract data and activities data to facilitate creation of a set of market assumptions and the forecast tool module includes means for operating on the market assumption set to forecast equipment supply, demand and pricing.

Another feature of the system for use with drilling rigs as the equipment is the equipment planning tool module which includes means for building a query to invoke operation of the search engine to retrieve data selected from the data group comprising data, contract data and activities data to facilitate creation and updating of rig deployment plans for effective utilization of available rigs in the rig market. Another feature of the equipment planning tool module is inclusion of a means for building an equipment supply query from data selected from the data group comprising equipment location, equipment operator, equipment contractor, equipment type, equipment activity status and equipment technical capabilities. Yet another feature of the equipment planning tool module is the inclusion of means for building an equipment demand query from data selected from the group comprising equipment location, equipment operator, equipment type, equipment status and demand requirements. Yet another feature of the equipment planning tool module if the invention is the inclusion of means for building an equipment specifications query from data selected from the group comprising equipment technical specifications and wherein the query invokes the search engine to cause the report engine to produce a report presenting a side by side comparison of the equipment specifications responsive to the query.

It is a feature of the invention that the business logic engine includes computer readable program code for operating on selected data stored in the relational database and those operations can include searching for selected data, comparing selected data, applying an optimization algorithm to selected data, and applying a forecasting algorithm to selected data. In an embodiment of the invention, the forecasting algorithm includes drilling activity factors selected from the group comprising well location, well water depth, total drilling depth, maximum well angle, hole size, maximum well displacement, number of casing strings, and drilling mud type.

In an embodiment of the invention the equipment usage sequencing tool module comprises means for building a query to invoke operation of the search engine to retrieve data selected from the data group comprising rig data, contract data and activities data to facilitated selection of a rig, activity of the selected rig, and contract activity of the selected rig to invoke operation of the report engine tool to create an activity sequence for the rig.

In an embodiment of the invention where the equipment includes rigs, the collaboration tool module includes means for invoking operation of the interface engine to display a data entry form for defining a set of requirements for a project requiring use of equipment, means for invoking operation of the search engine to retrieve rig data for rigs matching the project requirements input, and means for invoking the communications engine to submit the requirements to selected supply side market participants.

Another feature of the computer implemented system for managing and processing supply and demand information for participants in an equipment market the relational database includes: a plurality of equipment records containing information about specific pieces of equipment within an equipment category wherein each record comprises a unique equipment identifier and data associated with that identifier wherein the associated data is selected from the data group comprising technical specifications for the equipment, type of equipment, equipment owner, equipment contractor, current equipment activity, current equipment status, equipment availability date, equipment ownership history, and equipment technical upgrade history; and one or more equipment related activity records wherein each record comprises a unique activity identifier and data associated with that identifier wherein the associated data comprises data selected from the data group comprising activity location, activity status, activity operator, activity technical specifications, and equipment rental rate for the activity.

In an embodiment of the equipment deployment optimization tool module, the equipment deployment optimization tool module includes: means for invoking the interface engine to display a data entry form for defining a plurality of sets of requirements for a plurality of projects requiring use of equipment, a set of supply side market participants, and a set of objective project functions; means for invoking the communications engine to send the data entered in the data entry form to the data processor to invoke operation of the search engine to query the database in response to the entered data; and means for invoking the business logic engine to apply an optimization algorithm to the data resulting from operation of the search engine to determine optimal trades and economic incentives for optimal trades with the supply side market participants.

In connection with the equipment deployment optimization feature of the invention, in an embodiment, the database further includes one or more equipment contract records wherein each record comprises contract data selected from the group of data comprising equipment operator, equipment rental rate, and contract length.

Another feature of the invention is a method for creating a plan for equipment usage including providing a database contained in a computer storage medium for storing information relevant to participation in an equipment market. In this feature, the database can include a plurality of equipment records containing information about specific pieces of equipment within an equipment category. In this feature, each record can include a unique equipment identifier and data associated with that identifier, and the associated data can include technical specifications for the equipment, type of equipment, equipment owner, equipment contractor, current equipment activity, current equipment status, equipment availability date, equipment ownership history, and equipment technical upgrade history. In method for creating a plan for equipment usage, the method of this feature, the database can further include one or more equipment related activity records with each record including a unique activity identifier and data associated with that identifier. The associated data can include activity location, activity status, activity operator, activity technical specifications, and equipment rental rate for the activity. The method for creating a plan for equipment usage involves querying a database to identify and select an equipment group, querying the database to identify activities for which the equipment can be used, and assigning activities identified in the activity identification query step to equipment identified in the equipment identification querying step.

Another feature of the invention is a method for calculating economical day rates for a group of drilling rig for use in drilling wells in formations under the sea floor.

The method for calculating economical day rates includes determining a mechanical difficulty index for the well based on factors selected from the group comprising well location, well water depth, total drilling depth, maximum well angle, hole size, maximum well displacement, number of casing strings and type of drilling mud, determining a drilling performance index based on factors selected from the group comprising stratigraphic well description and drilling performance as a function of the described stratigraphy, determining a capability index based on identification of rigs available for the project, contractor capabilities associated with each of the available rigs, and combined contractor and rig performance histories, calculating a rig/hole performance index based on the mechanical difficulty, drilling performance and contractor capability indices, calculating the number of days required to complete the drilling project, and calculating an economic day rate for each of the available rigs based on the rig/hole performance index and the days requirement to complete the drilling project.

In one embodiment, determining the well mechanical difficulty index in the method for calculating economical day rates includes determining drilling performance as a function of mechanical difficulty and a real earth model.

The invention further includes a computer implemented method for analyzing supply and demand information in an equipment market, the method including the steps of providing a relational database for receiving and storing in an electronic storage medium data relevant to supply and data relevant to demand, providing a first set of computer readable program code for processing incoming data for storage in the relational database, providing a second set computer readable program code for selectively retrieving data stored in the relational database, providing a third set of computer readable program code for performing operations on data stored in the relational database wherein the operations are selected from the group comprising searching for selected data, applying an optimization algorithm to selected data, applying a forecasting algorithm to selected data and calculating a price based on historical and current data stored in the relational database, and providing a user interface for selectively invoking operating of each of the first, second and third sets of computer readable program code. The method further includes a fourth set of computer readable program code for providing a user interface for invoking the functions performable by each of the first, second and third sets of computer readable program code.

The computer implemented method for analyzing supply and demand information in an equipment market having a number of market participants and can include creating a database from published information sources containing equipment supply data and equipment demand data, selectively adding to the database information received from one or more of the market participants, providing a graphical user interface for the market participants to organize and access selected information and to provide data for inclusion in the database, and providing analytical tools for operating on data in the database wherein the analytical tools include an optimization tool and a forecasting tool.

The computer implemented method for analyzing supply and demand information in an equipment market having a plurality of market participants, the step of selectively adding to the database information received from the market participants can include segregating public information so that private information can be accessed only by subsets of the market participants.

The invention further includes an Internet based knowledge base system for participants in a market for equipment wherein the participants include owners of the equipment and users of the equipment with the system including a relational database for receiving and storing information relevant to the market.

The information relevant to the market that can be received and stored by the system of the invention includes equipment information, which in turn can include equipment technical specifications and equipment activity information, and market participant information, which in turn can include participant identification information and participant market activities information.

The knowledge base system of the invention can further include computer readable program code for selectively retrieving information from the database in response to input queries from one or more of the market participants, computer readable program code for selectively receiving information from market participants and storing the information in the relational database, and computer readable program code for enabling the real time exchange among market participants of information about availability of equipment and needs for equipment.

A feature of the knowledge base system of the invention where the equipment includes drilling rigs for drilling in underwater formations is that the equipment technical specifications and equipment activity information can include data that includes rig performance information, and the rig performance information can include well specifications, well location, water depth, drilled depth, well angle, hole size, casing design, mud type, displacement, mechanical details, rig name, operator, hole problem incidents, HSE incidents, lost time incidents, downtime incidents, drilling costs, downtime, flat time and total time, stratigraphic description and stratigraphic penetration indices.

Another feature of the knowledge base system of the invention is that the equipment technical specifications and equipment activity can include mechanical specifications, type of equipment, equipment owner, equipment contractor, current equipment activity, current equipment status, equipment availability date, equipment ownership history, and equipment technical upgrade history.

Another feature of the invention is a method for generating a Gantt chart image from data stored in a database in response to search criteria entered by a program user where the image generating method includes providing a search engine in communication with the database for receiving the search criteria entered by program user and for generating search results in response to the entered search criteria creating a session object from each of the search criteria and the search results to generate result objects. The generating method can also include providing a server-side script for generating a hypertext markup language page having embedded therein image tags wherein each image tag has embedded therein an "src" component, providing an image rendering engine, and using the "src" component of the embedded image tags created by the server-side script to pull the search criteria from the session object. The generating method can also include calculating the width and height of the image to be produced by the rendering engine, generating an image map from the calculated width and height of the image in combination with the search results, generating a buffered object for receiving a drawn image, drawing rows on the buffered object, drawing each of the result objects on the buffered object wherein each result object becomes a chart element that relates to a discrete event in time, compressing the buffered object having the result subjects drawn thereon, encoding the buffered object as a streamed encoded image, and sending the encoded image to an Internet browser for display by the browser to the user.

Another feature of the invention is a computer program product for generating a Gantt chart image from data stored in a database in response to search criteria entered by a program user that includes a search engine in communication with the database for receiving the search criteria entered by program user and for generating search results in response to the entered search criteria, means for creating a session object from each of the search criteria and the search results to generate result objects, a server-side script for generating a hypertext markup language page having embedded therein image tags wherein each image tag has embedded therein an "src" component, an image rendering engine; means for using the "src" component of the embedded image tags created by the server-side script to pull the search criteria from the session object, means for calculating the width and height of the image to be produced by the rendering engine, means for generating an image map from the calculated width and height of the image in combination with the search results, means for generating a buffered object for receiving a drawn image, means for drawing rows on the buffered object, means for drawing each of the result objects on the buffered object wherein each result object becomes a chart element that relates to a discrete event in time, means for compressing the buffered object having the result subjects drawn thereon, means for encoding the buffered object as a streamed encoded image, and means for sending the encoded image to an Internet browser for display by the browser to the user.

The present embodiments relate to a computer implemented system for managing and processing mobile drilling unit supply and demand information for a user.

The system comprises a web application processor that can be in communication with an interface comprising a supply query for obtaining a set of supply data and an demand query for obtaining a set of demand drilling demand, which is also refers to as unfilled drilling requirements. The database processor can be in communication with the interface for receiving at least one of the queries wherein at least one query operates on a dynamic information relational database in communication with the database processor. The database can additionally provide a set of data responsive to the queries. The web application processor can further comprise computer instructions for translating the set of data into a viewable online report and the web application can transmit the viewable online report to a user contact device of the user such as a wireless phone, a pager, computer, Blackberry™, other personal digital assistants.

In one embodiment the supply query can comprise of different types of queries. Examples of such are as follows:

| Rig Table Field | Type | Unit | Description |
| --- | --- | --- | --- |
| AttritionCause | t_DescMed | | Reason Rig was Retired |
| AttritionDate | t_Date | | Date rig went or is going out of service |
| BareBoatLnik | t_Link | Link | Link to division table to identify charter bareboat company of rig |
| CurrentAreaLnk | t_Link | Link | Link to current area rig is in |
| CurrentBlockLnk | t_Link | Link | Link to current block rig is in |
| CurrentContractInfo | t_DescShort | | CurrentContractInfo |
| CurrentCountryLnki | t_Linki | Linki | Link to current block rig is in |
| CurrentFarmoutLnk | t_Link | | Current Farmout Company Link to Division Table |
| CurrentFarmoutName | t_Name | | Name of Current Farmout Company |
| CurrentRegionLnki | t_Linki | | Link to current region rig is in |
| CurrentShorebase | t_Name | | Current Shore base Name |
| CurrentSpudDate | t_Date | | Current Spud Date of well |
| CurrentSpudDateEstimated | t_YesNo | | Is Spud Date Estimated |
| CurrentTargetDepth | t_Number | Feet | Current Target Depth of well |
| CurrentTurnkeyCompanyLnk | t_Link | | Current Turnkey Company Link to Division Table |
| CurrentTurnkeyCompanyName | t_Name | | Name of current Turnkey Company |
| CurrentWell | t_DescShort | | |
| CurrentWellLocation | t_DescShort | | Current Location of Well |
| CurrentWellType | t_DescShort | | Current Type of Well |
| CurrentWellWaterDepth | t_Number | Feet | Current Well Water Depth |
| CurrentWorkoverDepth | t_Number | Feet | Current workover depth |
| DataDateFrom | t_Date | | Date Record Information is From |
| DataDateTo | t_Date | | Date Record Information is To |
| DayRate | t_Money | USD | USD per day for Vessel use |
| DesignWaterDepth | t_Number | Feet | Water depth rigs was designed to handle |
| FixtureDate | t_Date | | FixtureDate |
| IdleDate | t_Date | | Date Rig goes idle |
| JackupType | t_DescShort | | IS-Ind Leg Slotted, IC-Ind Leg Cant, MS-Matt Slotted, MC-Matt Cantilever |

-continued

| | | | |
|---|---|---|---|
| Notes | t_DescLong | | Notes on Rig |
| NotesClient | t_DescLong | | Client Notes Field Polaris |
| NotesStatusFuture | t_DescLong | | Notes Field |
| ODSFile | t_DescLong | | File where ODS Information was originated - if ODS |
| OfficialRigName | t_Name | | Official rig name |
| OriginalShipCountry | t_CityStateCountry | | Original Ship Country |
| OriginaShipCountry | | | |
| OriginalShipLocation | t_DescLong | | Original Ship Location |
| OriginalShipLocation | | | |
| OriginalShipYard | t_Name | | Original Ship Yard |
| OriginalShipYard | | | |
| PrinaryRigLnk | t_Link | Link | Link to primary rig within table |
| RigArea | t_Name | | Rig Area |
| RigClass | t_DescShort | | Classification of Rig |
| RigCompetitive | t_YesNo | | Does rig compete for open bids |
| RigCompetitiveType | t_DescShort | | Type of non-competive Rig |
| RigContractCode | | | |
| RigContractCodei | | | |
| RigContracted | t_Number | | |
| RigConvWaterDepth | t_Number | Feet | Water depth for a DP rig being moored in a conventional matter |
| RigCountry | t_DescShort | | Country rig is registered in |
| RigDeckLoad | t_Number | Tons | What the maximum load allowed for the deck is |
| RigDPCapable | | | |
| RigDPCapable | t_YesNo | | Is Rig DP Capable Yes/No |
| RigFieldName | t_Name | | Rig Field Name |
| RigFieldName | | | |
| RigFreeDate | t_Date | | Date Rig went Idle |
| RigFunction | t_DescShort | | Main function of the rig |
| RigGeneration | t_DescShort | | What generation the rig is from $1^{st}$, $2^{nd}$, $3^{rd}$, $4^{th}$, $5^{th}$ |
| RigID | t_id | UID | Unique identifier for the rig |
| RigServiceDate | t_Date | | When rig originate went in service, used to tell how many years rig has been in service |
| RigJackingSystem | t_DescShort | | Type of Jacking system used on Rig, Hydraulic, etc . . . |
| RigLaborContractorLnk | t_Link | Link | Link to Division table representing current labor contractor |
| RigManagerLnk | t_Link | Link | Link to Division table representing Manager of Rig |
| RigMoorType | t_DescShort | | Conventional, Directional Propultion, NA Rig name used |
| RigName | t_Name | | Rig name used |
| RigOperatorLnk | t_Link | Link | Link to Division table representing current operator of rig |
| RigOptionDate1 | t_Date | | Rig Option Date One |
| RigOptionDate2 | t_Date | | Rig Option Date Two |
| RigOwnerLnk | t_Link | Link | Link to division table representing the rig owner |
| RigOwnerName | t_Name | | |
| RigPrimeContractorLnk | t_Link | Link | Company which contracts the rig out |
| RigRatedWaterDepth | t_Number | Feet | What the rated water depth of the rig is |
| RigRegion | t_DescShort | | Region rig operates out of |
| RigStateProv | t_DescShort | | State or Province of Country rig is registered in |
| RigStatusFutureDate | t_Date | | Date Future Status ID takes effect |
| RigStatusFutureLnk | t_Link | Link | Identifier to denote future status ID |
| RigStatusLnki | t_Link | Link | Identifier to denote current status of rig |
| RigTypeLinki | t_Linki | Linki | Link to rig type table describing type of rig |
| RigWorkMode | t_DescShort | | Accommodation, Appraisal Drilling, Development, Exploration Drilling |
| RigZone | t_DescShort | | MMS Gulf of Mexico Zone, C, W, E |
| Status | t_DescShort | | Status of rig |
| StatusCode | t_DescShort | | Status Code of Rig |
| UN | t_Number | | OneOff shore Rig Number (Originated from ODS) |

| Rig Details Table Field | Type | Unit | Description |
|---|---|---|---|
| CantileverCapacity | t_Number | Tons | Maximum capacity of Cantilever |
| CantileverReach | t_Number | Feet | Length or reach of Cantilever unit in feet |
| CantileverWidth | t_Number | Feet | Width of Cantilever unit in feet |
| CementingUnit | t_DescShort | | Name of Cementing unit |
| CementingUnitMfg | t_Link | Link | Link to division for manufacture of cementing unit |
| CementingUnitPSI | t_Number | PSI | PSI for cementing unit |
| DataDateFrom | t_Date | | Date Record information is From |
| DataDateTo | t_Date | | Date Record Information is To |
| Derrick | t_Yes/No | | If True Derrick, else Mask |
| DerrickCapacity | t_Number | Tons | Derrick/Mask capacity in tons |
| DerrickHeight | t_Number | Feet | Derrick/Mask Height in feet |
| DerrickMfgLnk | t_Link | Link | Link to division identifying the Manufacture of Diverter |
| DerrickMfgName | t_DescShort | | |
| DerrickWidth | t_Number | Feet | Width of Derrick in feet |
| DiverterDiameter | t_Float | Inches | Diameter of Diverter |
| DiverterLnk | t_Link | Link | Link to Division defining manufacture of Diverter |
| DiverterPSI | t_Number | PSI | PSI of Diverter |
| DiverterType | t_DescShort | | Type of Diverter on board |
| DrawWorksHP | t_Number | HP | Horsepower rating of the Draw works manufacture |

-continued

| | | | |
|---|---|---|---|
| DrawWorksMfgLnk | t_Link | Link | Link to Division table describing Draw works manufacture |
| DrawWorksMfgName | t_DescShort | | |
| DrawWorksModel | t_DescShort | | Description of Model of Draw Works |
| DrillingDepthMax | t_Number | Feet | Maximum drilling depth of rig |
| DrillingLineSize | t_Float | Inches | Size of Drilling Line in inches |
| DrillingSlotLength | t_Float | Feet | Size of Drilling Slot in feet |
| DrillingSlotWisth | t_Float | Feet | Size of Drilling Slot in feet |
| DynamicPositionType | t_DescShort | | Type of dynamic position system on board if any |
| HeliDeckCapacity | t_Number | Tons | Maximum weight Helideck will support |
| HeliDeckSizeLength | t_Number | Feet | Length of Helideck in feet |
| HeliDeckWidth | t_Number | Feet | Width of Helideck in feet |
| LegLength | t_Number | Feet | Leg Length in feet |
| LegQty | t_Number | Qty | Number of legs on rig |
| LegSpacing1 | t_Number | Feet | Distance one for Leg spacing in feet |
| LegSpacing1Type | t_DescShort | | Longitudinal, Transverse, Equidistant |
| LegSpacing2 | t_Number | Feet | Distance two for Leg spacing in feet |
| LegSpacing2Type | t_DescShort | | Longitudinal, Transverse, Equidistant |
| MatHeight | t_Number | Feet | Height of Mat in feet |
| MatLength | t_Number | Feet | Length of Mat in feet |
| MatSlotLength | t_Float | Feet | Length of Slot in Mat in feet |
| MatSlotWidth | t_Float | Feet | Width of Slot in Mat in feet |
| MatWidth | t_Number | Feet | Width of Mat in feet |
| MoonPoolWidth | t_Float | Feet | Width of Moon Pool in feet |
| MoonPoolLength | t_Float | Feet | Length of Moon Pool in feet |
| OperatingDeckLoad | t_Number | Tons | Operating Variable Deck Load |
| OperatingDisplacement | t_Float | Tons | Operating Displacement of rig short tons |
| OperatingDraft | t_Float | Feet | Operating Draft of rig, transit draft for jackups |
| PipeHandlingMfgLnk | t_Link | Link | Automatic Pipe handling Manufacture |
| PipeHandlingModel | t_DescShort | | Automatic Pipe handling model |
| PreventorControl | t_DescShort | | |
| PreventorControlsMfgLnk | t_Link | Link | Blowout Preventor Controls Manufacture Link |
| PreventorControlsMfgName | t_Name | | Preventor Manufacture Name |
| PreventorControlsType | t_DescShort | | Type of blowout Preventor controls on board |
| PreventorDiametermax | t_Number | Inches | Maximum diameter of Preventor in inches |
| PreventorWorkingPressureMax | t_Number | PSI | Maximum Working Pressure for Preventor |
| PropulsionSystem | t_DescShort | | Type of Propulsion system on board |
| RigCost | t_Money | USD | Total cost of rig |
| RigCostEstimated | t_Yes/No | | Is rig cost an estimate |
| RigCountryLnk | t_Linki | Linki | Current country rig is working out of |
| RigDateDelivery | t_Date | | Date rig was completed/delivered |
| RigDateDeliveryOrig | t_Date | | Original rig delivery date |
| RigDateOrder | t_Date | | Date rig was ordered |
| RigDeckFree | t_Number | Feet | Amount of free deck space in square feet |
| RigDesign | t_DescMed | | Name of design of rig |
| RigDesignerLnk | t_Link | Link | Link to division table defining rig designer |
| RigDesignerName | t_DescShort | | |
| RigDesignerNotes | t_DescShort | | Notes on rig design |
| RigHullBreadth | t_Float | Feet | Width of hull at widest point |
| RigHullDepth | t_Float | Feet | Hull depth for jackups |
| RigHullLength | t_Float | Feet | Length of Hull |
| RigHullNewDeliv | t_Yes/No | | Was the Hull built new for the rig or was it used from another vessel |
| RigHullNumner | t_DescShort | | Assigned by the shipyard that built the rig |
| RigLnk | t_Link | Link | Link to unique identifier in master rigs table |
| RigMarketed | t_Yes/No | | If true or yes, the rig is being marketed by the rig owner |
| RigOrderDate | t_Date | | Date rig was ordered |
| RigPontoons | t_Number | Qty | Total Pontoons on rig |
| RigQuarters | t_Number | Persons | Quarters or beds capacity of rig |
| RigRegistryCountry | t_Name | | Country rig is currently registered in |
| RigROVSystem | t_DescShort | | Type of ROV unit available, Magnum 30 |
| RigSpeculative | t_Yes/No | | Was the rig built on a speculative order |
| SCRMfgLnk | t_Link | Link | SCR System Manufacture |
| SCRMfgName | t_DescShort | | |
| ShaleShakerMfgLnk | t_Link | Link | Shale shaker manufacture link |
| ShaleShakerQty | t_Number | Qty | Number of Shale Shaker |
| ShaleShakerType | t_DescShort | | Type of Shale Shaker |
| SolidsControl | t_DescShort | | Type of Shaker unit |
| StorageBaseOil | t_Number | CubicFeet | Base oil storage |
| StorageCementBulk | t_Number | CubicFeet | Bulk cement storage |
| StorageFuel | t_Number | CubicFeet | Storage of fuel |
| StorageMudBulk | t_Number | SquareFeet | Bulk mud storage |
| StorageMudliquid | t_Number | CubicFeet | Total liquid mud storage |
| StorageSack | t_Number | CubicFeet | Sack storage |
| StorageWaterDrilling | t_Number | CubicFeet | Total storage drilling water |
| StorageWaterPotable | t_Number | CubicFeet | Maximum gallons of potable water storage |
| SubseaHandling | t_DescShort | | Method of handling sub sea equipment |
| SurvivalDeckLoad | t_Number | Tons | Deck load during a survival situation |
| SurvivalDisplacement | t_Number | Tons | Displacement of rig when conditioned for storm or other survival situation |

-continued

| | | | |
|---|---|---|---|
| SurvivalDraft | t_Number | Feet | Draft of rig when conditioned for storm other survival situation |
| TopDriveDeliveryDate | t_DescShort | | Date Top Driver is to be delivered |
| TopDriverMfg | t_Name | | Manufacture of Top Drive unit |
| TopDriveModel | t_DescShort | | Model of Top Driver model |
| TopDriveOutput | t_DescShort | | Maximum HP rating of Top Driver unit |
| TrasitDeckLoad | t_Number | Tons | Variable deck load during transit |
| TransitDisplacement | t_Number | Tons | Displacement of rig during transit |
| TransitDraft | t_Number | Feet | Draft of rig during transit |
| TurnkeyCompanyLnk | t_Link | Link | The company that turn keying rig, links to division table |
| TurnkeyCompanyName | t_DescShort | | |
| Working WaterDepthMax | t_Number | Feet | Maximum working water depth of rig |
| Working WaterDepthMin | t_Number | Feet | Minimum working water depth of rig |
| WorkOverDepth | t_Number | Feet | Rated workover drilling depth |
| YearBuilt | t_Number | Other | Year rig was manufactured |

| Rig Build Details Table Field | Type | Unit | Description |
|---|---|---|---|
| BuildCompanyLnk | t_Link | Link | Link to Division ID that represents company referenced in Build Type |
| BuildCompletedDate | t_Date | | Date Built was completed |
| BuildCost | t_Money | USD | Total cost of the build |
| BuildCostActual | t_Yes/No | | If true the cost given are actual, otherwise they are estimated |
| BuildNotes | t_DescLong | | Notes concerning build |
| BuildOrderDate | t_Date | | Date build was ordered |
| BuildStarDate | t_Date | | Date build stared |
| BuildTypeLnk | t_Link | Link | Link to build type describing the entry |
| BuildYardLnk | t_Link | Link | Link to yard in build yard fthat represents the yard that work was done |
| RigBuildDetailsID | t_id | UID | Unique identifier for record |
| RigLnk | t_Link | Link | Link to rig this entry pertains to |

| Rig Anchors Table Field | Type | Unit | Description |
|---|---|---|---|
| AnchorCapacity | t_Number | Tons | Capacity of anchor |
| AnchorChainDiameter | t_Number | Inches | Diameter of anchor chain in inches |
| AnchorChainLength | t_Number | Feet | Length of chain for anchor in feet |
| AnchorMfgLnk | t_Link | Link | Link to division table for anchor manufacture |
| AnchorMfgName | t_Name | | |
| AnchorQty | t_Number | Qty | Number of anchors of this type |
| AnchorType | t_DescShort | | Type of anchor |
| AnchorWeight | t_Number | Lbr | Weight of anchors of this type in pounds |
| DataDateFrom | t_Date | | Date record information is from |
| DataDateTo | t_Date | | Date record information is to |
| RigAnchorsID | t_id | UID | Unique identifier for anchor table |

| Rig Crane Table Field | Type | Unit | Description |
|---|---|---|---|
| CraneBoomLength | t_Number | Feet | Length of boom on crane in feet |
| CraneCapacity | t_Number | Tons | Capacity of crane in tons |
| CraneMfgLnk | t_Link | Link | Link to manufacture for crane in the division table |
| CraneModel | t_DescShort | | Model of crane on board |
| CraneNotes | t_DescMed | | Notes on crane |
| CraneQty | t_Number | Qty | Quantity of cranes on board |
| CraneReach | t_Float | Feet | Crane reach for capacity |
| CraneMfgName | t_Name | | |
| DataDateFrom | t_Date | | Date record information is from |
| DateDateTo | t_Date | | Date record information is to |
| RigCraneID | t_id | UID | Unique identifier for rig crane table |
| RigLnk | t_Link | Link | Link to rig table for master record |

| Rig Engine Table Field | Type | Unit | Description |
|---|---|---|---|
| DataDateFrom | t_Date | | Date record information is from |
| DataDateTo | t_Date | | Date record information is to |
| EngineHP | t_Number | HP | Horsepower of this model of engine |
| EngineMfgLnk | t_Link | Link | Link to division manufacture of this engine model |
| EngineMfgName | t_Name | | |
| EngineModel | t_DescShort | | Model of engine |
| EngineQty | t_Number | Qty | Quantity of engines of this model |
| RigEngineID | t_id | UID | Unique identifier for rig engine table |
| RigLnk | t_Link | Link | Rig this record pertains to |
| RigPropellors | t_Number | Qty | Number of propellers for these engines |

| Rig Generator Table Field | Type | Unit | Description |
|---|---|---|---|
| DataDateFrom | t_Date | | Date record information is from |
| DataDateTo | t_Date | | Date record information is to |

-continued

| | | | |
|---|---|---|---|
| GeneratorKW | t_Number | KW | Kilowatts output of generator |
| GeneratorMfgLnk | t_Link | Link | Link to division for manufacture of generator |
| GeneratorMfgName | t_Name | | |
| GeneratorModel | t_DescShort | | Model of generator |
| GeneratorQty | t_Number | Qty | Quantity of generators of this type |
| RigGeneratorID | t_id | UID | Unique identifier for the table |
| RigLnk | t_Link | Link | Link to rig table for primary link |

| Rig Mooring Line Table Field | Type | Unit | Description |
|---|---|---|---|
| DataDateFrom | t_Date | | Date record information is from |
| DataDateTo | t_Date | | Date record information is to |
| MooringLineDiameter | t_Float | Inches | Mooring line diameter in inches |
| MooringLineLength | t_Number | Feet | Mooring line length in feet |
| MooringLineMfgLnk | t_Link | Link | Link to division table for manufacture of Mooring line |
| MooringLineMfgName | t_Name | | |
| MooringLineQty | t_Number | Qty | Mooring line quantity |
| MooringLineType | t_DescShort | | Mooring line type |
| RigLnk | t_Link | Link | Link to division table for master Rig record |
| RigMooringLineID | t_id | UID | Unique identifier for rig mooring line |

| Rig Mud Pumps Table Field | Type | Unit | Description |
|---|---|---|---|
| DataDateFrom | t_Date | | Date record information is from |
| DataDateTo | t_Date | | Date record information is to |
| MudPumpHP | t_Number | HP | The Horsepower of this type of Mud Pumps |
| MudPumpMfgLnk | t_Link | Link | Link to division to table for manufacture of Mud Pumps |
| MudPumpMfgName | t_Name | | |
| MudPumpPressure | t_Number | PSI | Pressure of Mud Pump |
| MudPumpQty | t_Number | Qty | Quantity of Mud Pumps of this type |
| MudPumpType | t_DescShort | | Type of Mud Pump on rig |
| RigLnk | t_Link | Link | Link to rig |
| RigMudPumpID | t_id | UID | Unique identifier for table |

| Rig Preventors Table Field | Type | Unit | Description |
|---|---|---|---|
| DataDateFrom | t_Date | | Date record information is from |
| DataDateTo | t_Date | | Date record information is to |
| PreventorDiameter | t_Float | Inches | Diameter of Preventor in inches |
| PreventorMfgLnk | t_Link | Link | Link to division table describing manufacture |
| PreventorMfgName | | | |
| PreventorQty | t_Number | Qty | Quantity of this type of Preventor |
| PreventorType | t_DescShort | | Type of Preventor, double U rams, annular |
| PreventorWorkingPressure | t_Number | PSI | Working pressure of Preventor |
| RigLnk | t_Link | Link | Rig this Preventor Pertains to |
| RigPreventorsID | t_id | UID | Unique identifier for rig Preventor, not used other than replication |

| Rig Previous Names Table Field | Type | Unit | Description |
|---|---|---|---|
| RigLnk | t_Link | Link | Link to current rig for current rig name |
| RigNameDateFrom | t_Date | | Date Name started being used |
| RigNameDataDateTo | t_Date | | Date name ciesed to be used |
| RigNamePrevious | t_DescShort | | Previous name of rig |
| RigPreviousNemesID | t_id | UID | Unique identifier for the table |

| Rig Riser Table Field | Type | Unit | Description |
|---|---|---|---|
| DataDateFrom | t_Date | | Date record information is from |
| DataDateTo | t_Date | | Date record information is to |
| RigLnk | t_Link | Link | Link to rig table for primary record |
| RigRiserID | t_id | UID | unique identifier of riser table |
| RiserDiameter | t_Float | Feet | Riser diameter in feet |
| RiserLength | t_Number | Feet | Riser length in feet |
| RiserMfgLnk | t_Link | Link | Manufacture link in division |
| RiserMfgName | t_Name | | |

| Rig Riser Tensioner Table Field | Type | Unit | Description |
|---|---|---|---|
| DataDateFrom | t_Date | | Date record information is from |
| DataDateTo | t_Date | | Date record information is to |
| RigLnk | t_Link | Link | Link to primary record in rigs table |
| RigRiserTensionerID | t_id | UID | Unique identifier of riser tensioner table |
| TensionerCapacity | t_Number | Tons | Riser tensioner capacity |
| TensionerMfgLnk | t_Link | Link | Link to primary record in rigs table |
| TensionerMfgName | t_Name | | |
| TensionerQty | t_Number | Qty | Quantity of this type of tensioner |
| TensionerType | t_DescShort | | Type of tensioner |

| Rig Riser Tensioner Table Field | Type | Unit | Description |
| --- | --- | --- | --- |
| DataDateFrom | t_Date | | Date record information is from |
| DataDateTo | t_Date | | Date record information is to |
| RigLnk | t_Link | Link | Link to rig table for master record |
| RigWellheadConnectorID | t_id | UID | Unique identifier for table |
| WellheadConnectorDiameter | t_Float | Inches | Diameter of wellhead connector |
| WellheadConnectorMfgLnk | t_Link | Link | Link to division table for manufacture |
| WellheadConnectorMfgName | t_Name | | |
| WellheadConnectorModel | t_DescShort | | Model of wellhead connector |
| WellheadConnectorWPressure | t_Number | PSI | Wellhead connector working pressure |

| Rig Winch Table Field | Type | Unit | Description |
| --- | --- | --- | --- |
| DataDateFrom | t_Date | | Date record information is from |
| DataDateTo | t_Date | | Date record information is to |
| RigLnk | t_Link | Link | Link to rig record |
| RigWinchID | t_id | UID | Unique identifier of winch table |
| WinchCapacity | t_Number | Tons | Capacity of winch in tons |
| WinchMfgLnk | t_Link | Link | Link to division of winch |
| WinchMfgName | t_Name | | |
| WinchNotes | t_DescMed | | Notes on winch |
| WinchQty | t_Number | Qty | Number of winches of this type |
| WinchType | t_DescShort | | Type of winch, dbl, sng |

| Rig Status Table Field | Type | Unit | Description |
| --- | --- | --- | --- |
| RifStatus | t_Name | | Status name, descriptive name of rig status |
| RigStatusCategory | t_Name | | Category of rig status, working, non-working, under construction |
| RigStatusDesc | t_DescMed | | Description status |
| RigStatusIDi | t_idi | UIDi | Unique identifier for status table |
| RigStatusShort | t_Name | | Short name of status, WO-Dri for drilling, and so on |

| Rig Type Table Field | Type | Unit | Description |
| --- | --- | --- | --- |
| RigType | t_Name | | Semi submersible, jackup, tender, ship, platform |
| RigTypeDesc | t_DescMed | | Description of rig type |
| RigTypeIDi | t_idi | UDIi | Unique identifier for table |
| RigTypeShort | t_Name | | Short name for rig type |

| Rig Contracts Table Field | Type | Unit | Description |
| --- | --- | --- | --- |
| AreaLnk | t_Link | | |
| ContactInfo | t_DescLong | | Contact information |
| ContractAgreedDate | t_Date | | Date contract was agreed to |
| ContractDayRate | t_Money | USD | Day rate of contracts |
| ContractDetails | t_DescLong | | Detail notes of contract |
| ContractEndDate | t_Date | | End date for contract |
| ContractEstimated | t_Yes/No | | If yes or true contract information is an estimated |
| ContractName | t_Name | | Name of contract |
| ContractOperatorLnk | t_Link | Link | Who the contract was issued to |
| ContractOperatorName | t_Name | | Name of company contract was issued to |
| ContractOwnerLnk | t_Link | Link | Who the contract was issued from, the owner of the vessel |
| ContractOwnerName | t_Name | | Name of the owner of the vessel |
| ContractStartDate | t_Date | | Start date for contract |
| ContractValue | t_Money | USD | Value of contract is determined by the number of days X the date rate, then adjusted |
| CountryOfContract | t_DescShort | | Country contract takes place |
| OSDFile | t_Name | | |
| PrimaryContractorLnk | t_Link | Link | Primary contractor Link |
| ProjectJobsLnk | t_Link | Link | Link to protect jobs for job description and scope of job |
| RigContractsID | t_id | UID | Unique identifier for table |
| RigContractsStatusLnki | t_Link | | Rig contract status link |
| RigLnk | t_Link | Link | Link to rig contract pertains to |
| RigStatusLnki | t_Linki | Linki | Status of rig on contract |
| SubContractLink | t_Link | Link | If nor null, then RContractID of child (Farmount) |

| Rig Activities (Events) Data | | | |
| --- | --- | --- | --- |
| Rig Jobs Table Field | Type | Unit | Description |
| AreaLnk | t_Link | Link | Link to area where job resides |
| AreaNotes | t_DescShort | | Notes on area where job is |
| BlockLnk | t_Link | Link | Link to block table |
| Contract | t_Yes/No | | If yes, this job has a contract |
| ContractClientLnk | t_Link | Link | Client of contract, if there is a contract |
| ContractClientName | t_Name | | Name of contract client free from entry |
| ContractDetails | t_DescShort | | Details about the contract |

-continued

| | | | |
|---|---|---|---|
| DateCreated | t_Date | | Date project jobs record was created |
| DateModified | t_Date | | Date project jobs record was modified |
| DayRate | t_Money | | Rate at time of contract |
| DayRateConfidential | t_Yes/No | | If true, day rate is confidential |
| DayRateEstimated | t_Yes/No | | If true, day rate is an estimate or approximate |
| DayRateNotes | t_DescShort | | Notes on day rate |
| FieldsLnk | t_Link | | |
| FixtureDate | t_Date | | Fixture date |
| FixtureDate | t_Date | | Fixture date |
| JobDateConplete | t_Date | | Actual date job will start |
| JobDateComplete | t_Date | | Estimated competition date for job |
| JobDateStart | t_Date | | Estimated start date for job |
| JobDateStart | t_Date | | Actual date job will start |
| JobDescription | t_DescMed | | Description of work involved |
| JobNotes | t_DescMed | | Notes on project job |
| PolarisEntry | | | Polaris entry |
| PolarisFile | t_Name | | File of table from Polaris where data originated |
| ProjectJobsID | t_id | UID | Unique identifier for table |
| ProjectJobsStatusLnki | t_Linki | Linki | Shows status of job |
| ProjectJobsTypeLnki | t_Linki | Linki | Described what the job is for, rig, vessel, platform |
| projectWorkMode | t_DescShort | | Comma Delimited list of work mode ID's form the work mode table |
| RigContractLnk | t_Link | | Link to rig contracts table |
| ShoreBase | t_Name | | Shore base name |
| StateProv | t_CityStateCountry | | State of providence |
| SubLetComment | t_DescMed | | Comments describing sublet availability in contract |
| SubLetDate | t_Date | | Date Sublet availability begins |
| SubLetDays | t_Number | | Number of days sublet window will be |
| SubLetProbableScale | t_Number | | 1 to 10 rating of probability of sublet window |
| TurnKeyCompanyLnk | t_Link | | Link to division table for turn key company name |
| TurnKeyCompanyName | t_Name | | Division name |
| VesselContractorLnk | t_Link | Link | Contractor of vessel at time of job |
| VesselContractorName | t_Name | | Name of vessel contractor free form entry |
| VesselLnk | t_Link | | Links to appropriate vessel table, like rig, platform |
| VesselStatuLnki | t_Linki | Linki | Links to appropriate vessel status table like rig status, platform status |
| WellLocation | t_DescShort | | Current Well location |
| WellName | t_DescShort | | Name of Well |
| WellOCS | | | Well OCS |
| WellSpudDate | t_Date | | Well Stud date |
| WellStudDateEstimated | t_Yes/No | | Estimated spud date of Well |
| WellTargetDepth | t_Number | Feet | Target depth of Well |
| WellTypeLnki | t_Link | | Well type link |
| WellWaterDepth | t_Number | Feet | Well water depth |
| WellWaterDepthEst | t_Yes/No | Feet | Estimated Well water depth |
| WellWorkoverDepth | t_Number | Feet | Well work over depth |

The dynamic information relational database can include a mobile drilling unit database that has data of the supply query and elements of the demand drilling requirement query, a text based database, a publications database, and a demand side specific database that has information on demand drilling requirements with unfilled contracts pending. Unfilled contracts pending refers to people who need drilling rights that have no pending rig commitments. A text based database can include a news database on the mobile drilling unit market and a commentary database on the mobile drilling unit market. A publications database can include newsletters on the mobile drilling unit market, news wire services, data reports magazines and forecast publications on the mobile drilling market.

In an alternate embodiment the open demand drilling requirement query can comprise of a set of open demand data. Examples of such are as follows:

TABLE 2

| Unfilled demand drilling requirement query | Examples of Information sought |
|---|---|
| Unfilled demand geographic location | South China Sea |
| Unfilled demand mobile drilling unit specifications | Maximum water depth |

TABLE 2-continued

| | |
|---|---|
| Time requirements for unfilled demand mobile drilling units | Minimum time duration for use |
| Preferred type of unfilled demand mobile drilling unit | Semisubmersible |
| Date tender offer is due for drilling contract | Date: Dec. 7, 2006 |

The demand drilling requirement query can include a set of demand data that includes demand geographic location, drilling logistics (such as distance from shore base), estimate time frame for use of drilling equipment, demand mobile drilling unit drilling depth and well specification, mobile drilling unit day rate, geophysical conditions (such as surface of sea floor, mud, shallow gas nearby, hard rock nearby, salt dome nearby), number of wells, type of wells (such as exploratory, developing or workovers), time requirements for open demand mobile drilling units, working water depth, preferred type of demand mobile drilling units and date tender offer is due for drilling.

In yet another embodiment the dynamic information relational database can have information such as: mobile drilling unit databases, text based databases (such as news databases on the mobile drilling unit market and commentary databases on the mobile drilling unit market), publications databases (such as newsletters on the mobile drilling unit market and forecast publications on the mobile drilling market), and demand side specific databases having information on open demand drilling requirements without contracts.

In one embodiment the newsletters are selected from the group consisting of news wire services, data reports, magazines, and forecast publications on the mobile drilling market.

In yet another embodiment the online report can be a webpage.

In one embodiment the mobile drilling units can be offshore drilling units and the filter can include rated water depth. The rated water depth can be from about 10 feet to about 10,000 feet.

In an embodiment of the system the viewable online report can provided in an email to the user. The user would then be able to retrieve the online report at their convenience at any time after the initial query. The e-mails can also be scheduled e-mails so that the same query would be repeated at scheduled time interviews throughout a user specified time period.

In yet another embodiment the viewable online report can be communicated to the user through two industry standard protocols simultaneously to reach the user.

The viewable online report can be directed directly to at least two user contact device simultaneously, wherein the user contact devices are selected from the group: a wireless phone, a pager, a wireless phone, a pager, computer, Blackberry™, other personal digital assistants.

In yet another embodiment the dynamic informational relational database can be adapted to be continuously updated weekly, daily, or even hourly. In addition to this the dynamic information relational database can be updated in real time.

In one embodiment the viewable reports can be standardized reports.

In yet another embodiment the standardized reports can include a new fixtures standard report, a backlog standard report, a technical specifications report, and an availability standard report. The user would then be able to compare the different reports by side by side comparison.

In an embodiment of the system the interface can have computer instructions for personalizing queries to a user with a default to provide a customized query each time the user connects with the interface. These computer instructions for creating a viewable online charting tool can request sequence tool data which can be selected from: historical data on specific tool use, forecast data on specific tool use or links for connecting to other data sites with mobile drilling units.

In one embodiment the interface can have a means for generating graphical output, a means for generating a graphical user interface and a means for generating tabular output.

In yet another embodiment wherein the means for generating graphical output can include a means for generating graphs showing the formed user specified information over time or multiple sets of formed user specified information over time.

In one embodiment the computer instructions for creating a viewable on line report can include a means for creating a session object from each of the search criteria and the search results to generate result objects.

A server-side script can be used for generating a hypertext markup language page having embedded therein image tags wherein each image tag has embedded therein an "src" component. This then can include a means for using the "src" component of the embedded image tags created by the server-side script to pull the search criteria from the session object.

Computer instructions can also include a means for calculating the width and height of the image to be produced by the rendering engine, and a means for generating an image map from the calculated width and height of the image in combination with the search results. Another set of computer instructions can be used for generating a buffered object for receiving a drawn image.

There can also include a means for drawing each of the result objects on the buffered object wherein each result object becomes a chart element that relates to a discrete event in time, in addition to a means for compressing the buffered object having the result subjects drawn thereon. Finally there can additionally be a means for sending the encoded image to an Internet browser for display by the browser to the user.

In yet another embodiment the means for generating a Gantt chart image can include a means for drawing rows on the buffered object and a means for encoding the buffered object as a streamed encoded image.

Figure 1:
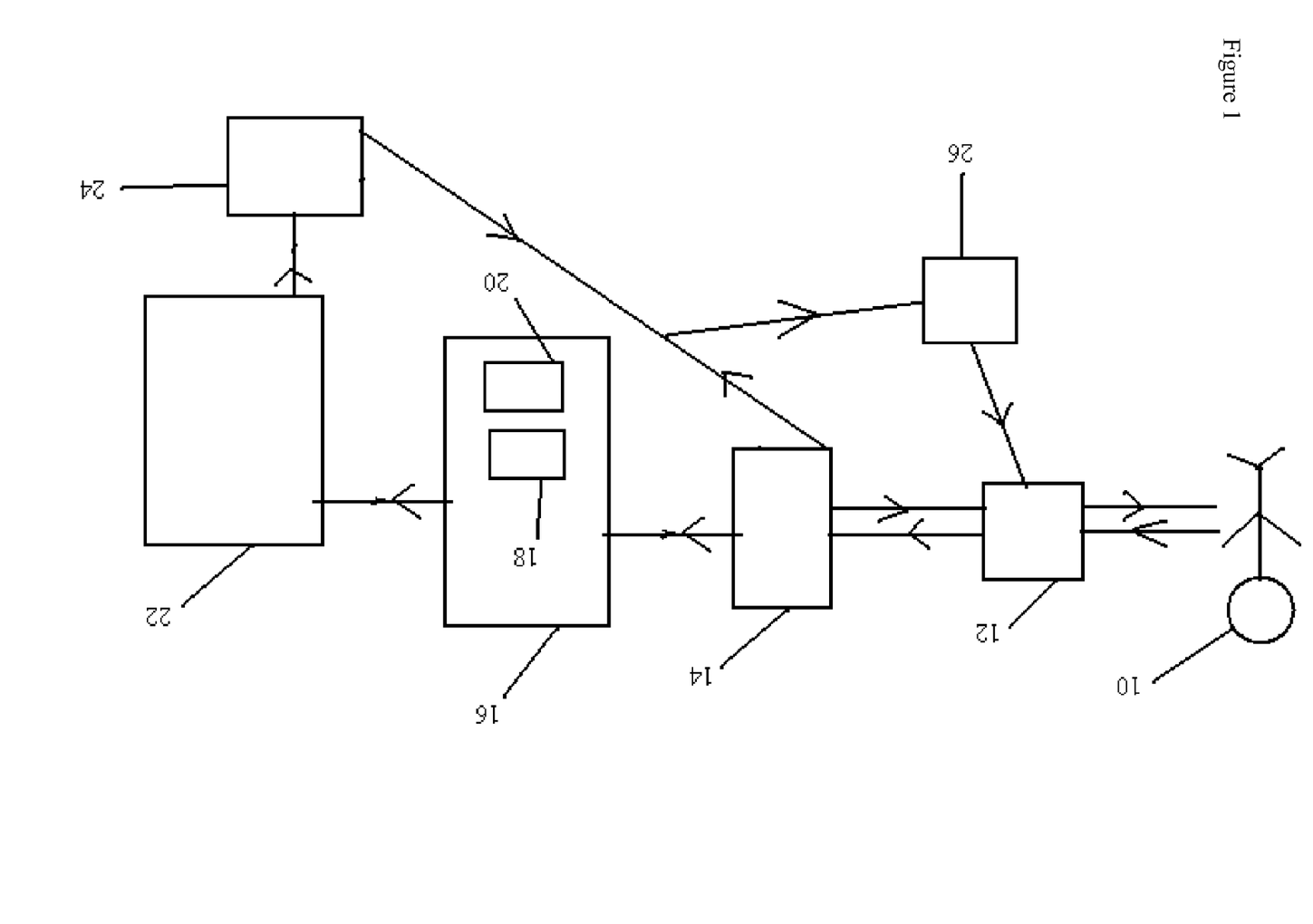
FIG. 1 depicts a user obtaining supply and demand information regarding mobile drilling.

Now referring to the Figures, FIG. 1 depicts a user 10 with access to a user contact device 12. The user contact device can be a computer Through the usage of the user contact device, the user can submit a query to a web application processor 14. The query of the web application processor then interacts with the interface 16, obtaining a supply query 18, for obtaining a set of supply data, and an open demand drilling requirement query 20, for obtaining a set of open demand drilling data. The interface can then communicate with a database processor 22 which is responsible for providing a set of data responsive to the queries to a dynamic information relational database 24. The dynamic information relational database then communicates with the web application processor to generate a viewable online report 26 for the user contact device. This viewable online report is then viewable by the user through the user contact device.

The supply query can include information including build information, cementing, classification, cranes, drilling operations information, design and generation of design, derricks or masts, drawworks, geographic location of equipment, main characteristics of a mobile drilling rig, mooring type, mooring system, moonpool size, mud system, ownership and management, rig dimensions, rig name, registry, rig power, rig upgrades, riser, rotation system, storage capacity, top drive, well, BOP control equipment, and years in service. The build information can include shipyard information, shipyard location and construction cost. The drilling operation information can include drilling depth, main engines, main generators, SCR manufacturer information, and drill line information. Main characteristics of the mobile drilling rig can include water depth, hull dimensions, operating draft, variable load and quarters.

The supply query can have a work history of the rig that includes historical contracts and future contracts.

The historical contracts can have the current location of the rig, the operator of the rig and day rates.

Figure 2:
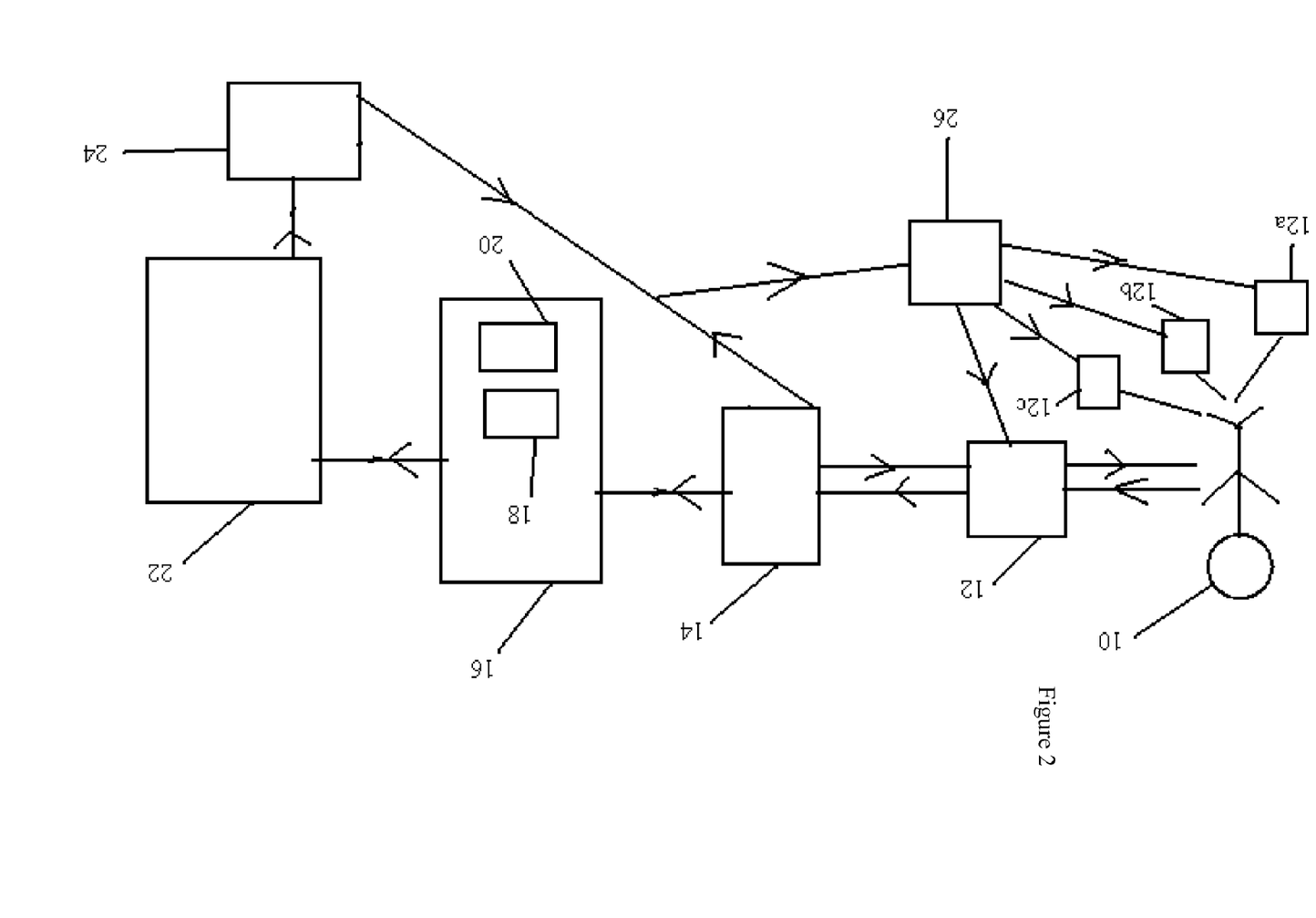
FIG. 2 depicts a user receiving supply and demand information regarding mobile drilling to more than one user contact device.

FIG. 2 depicts the viewable online report transmitted to more than one user contact device 12a, 12b, 12c. This transmission of the viewable online report can either occur simultaneously or consecutively through a user specified time period.

It is contemplated that the system will enable the following types of forecasts for the oil business, the forecast utilization, for supply and demand, forecasting of day rates, forecasting of new rig building and new equipment requirements and equipment and rig requirements, forecasting demand by geographical markets, analyzing equipment components and market shares, analyzing equipment types and availability.

While these embodiments have been described with emphasis on the embodiments, it should be understood that within the scope of the appended claims, the embodiments might be practiced other than as specifically described herein.

What is claimed is:

1. A computer implemented system for managing supply and demand information of mobile drilling units for a user, said system includes a data processor programmed to receive and store electronically received data in a relational database in an electronic storage medium, said system comprises:
   an application program in communication with said data processor to access from said storage medium a time period specific supply query, wherein said time period specific supply query comprising a rig table field with technical requirements with at least one piece of data for obtaining a set of supply data, and a demand time period specific drilling demand requirement query with at least one technical specification for obtaining a set of demand drilling demand data; and
   a database processor in communication with said application program to receive at least one query, wherein said query is from said relational database, wherein said relational database comprising mobile rig unit technical specifications with time periods of availability in communication with a database, wherein said relational database provides a set of data mobile drilling unit technical specifications responsive to the query, and an available mobile rig unit usage data prospective usage data and historical usage data,
   wherein the application program comprises computer instructions for storing the set of data mobile drilling technical specifications to translate the set of data into a viewable online report representing the set of technical specifications, transmitting the viewable online report to a user contact device that matches the time period specific supply query and the time period specific drilling demand requirement query to available usage data, prospective usage data and historical usage data, wherein said specific drilling demand requirement query comprises a set of drilling demand data, wherein said set of drilling demand data comprising a member of the group consisting of: demand geographic location; drilling logistics; estimated time frame for use of drilling equipment; demand mobile drilling unit drilling depth and well specifications; mobile drilling unit day rate; geophysical conditions; number of wells; type of wells; time requirements for open demand mobile drilling units; working water depth; preferred type of demand mobile drilling unit; date tender offer is due for drilling; and combinations thereof; creating a session object from each of the supply query and the demand drilling requirement query to generate result objects; and generating a hypertext markup language page having embedded therein image tags, wherein each image tag has embedded therein an "src" component to pull the supply query and the demand drilling requirement query from the session object.

2. The system of claim 1, wherein the supply query comprises a member of the group comprising:
   build information including:
      shipyard;
      shipyard location;
      construction cost;
   cementing;
   classification; and
   cranes;
   drilling operations information including:
      drilling depth;
      main engines;
      main generators;
      SCR manufacturer; and
      drill line;
   design and generation of design;
   derricks or masts;
   drawworks;
   geographic location of equipment;
   main characteristics of a mobile drilling rig including:
      water depth;
      hull dimensions;
      operating draft;
      variable load;
   quarters;
   mooring type;
   mooring system;
   moonpool size;
   mud system;
   ownership and management;
   ng dimensions;
   rig name;
   registry;
   rig power;
   rig upgrades;
   riser;
   rotation system;
   storage capacity;
   top drive;
   well;
   BOP control equipment;
   year in service; and
   combinations thereof.

3. The system of claim 1, wherein the supply query comprises a work history of the rig comprising a member selected from the group: historical contracts, and future contracts.

4. The system of claim 3, wherein the historical contracts comprises a member of the group consisting of: current location of rig; operator of rig; and day rate.

5. The system of claim 1, wherein said mobile drilling unit comprising
   data of the supply query and elements of the drilling demand drilling requirement query;
   a text based database, said text based database comprising:
   a news database on the mobile drilling unit market;
   a commentary database on the mobile drilling unit market; and
   combinations thereof,
   a publications database, said publication database comprising:
   newsletters on the mobile drilling unit market;
   news wire services;
   data reports; magazines;
   forecast publications on the mobile drilling market; and
   a demand side specific database, said demand side specific database comprising
   information on drilling demand requirements with unfilled contracts pending.

6. The system of claim 1, wherein the viewable online report is a webpage.

7. The system of claim 1, wherein the mobile drilling units are offshore drilling units and the supply query further comprises rated water depth.

8. The system of claim 1, wherein the viewable online report is provided in an email to the user.

9. The system of claim 7, wherein the email is a scheduled email.

10. The system of claim 1, wherein the viewable online report is communicated to the user through two industry standard protocols simultaneously.

11. The system of claim 1, wherein the viewable online report is directed directly to at least two user contact devices simultaneously, and wherein the at least two user contact devices are selected from the group: a wireless phone, a pager, a computer, another personal digital assistant, and combinations thereof.

12. The system of claim 1, wherein said database is updated in real time.

13. The system of claim 1, wherein the viewable online report reports are is a standardized repots.

14. The system of claim 13, wherein the standardized report includes a new fixtures standard report, a backlog standard report, technical specifications report, and an availability standard report, for side by side comparison.

15. The system of claim 1 wherein said application program comprises:
    means for generating graphical output;
    means for generating a graphical user interface; and
    means for generating tabular output.

16. The system of claim 1, wherein the means for generating graphical output comprises means for generating graphs showing the formed user specified information over time, multiple sets of formed user specified information over time or combinations thereof.

17. The system of claim 1, wherein the means for generating a Gantt chart image comprises: means for drawing rows on the buffered object; and means for encoding file buffered object as a streamed encoded image.

* * * * *